United States Patent [19]

Sudoh et al.

[11] Patent Number: 5,339,205
[45] Date of Patent: Aug. 16, 1994

[54] RECORDING/REPRODUCTION APPARATUS WITH ERROR DETECTION CAPABILITY

[75] Inventors: Kengo Sudoh; Chitoku Kiyonaga, both of Hiroshima, Japan

[73] Assignee: Sharp Kabushiki Kaisha, Osaka, Japan

[21] Appl. No.: 779,231

[22] Filed: Oct. 18, 1991

[30] Foreign Application Priority Data

Oct. 23, 1990 [JP] Japan .................. 2-286811

[51] Int. Cl.⁵ .................. G11B 5/09; G06F 11/00
[52] U.S. Cl. .................. 360/53; 371/57.2
[58] Field of Search .......... 371/57.1, 57.2, 47.1, 371/61.1; 360/13, 18, 48, 53

[56] References Cited

U.S. PATENT DOCUMENTS

| | | | |
|---|---|---|---|
| 4,157,573 | 6/1979 | Aghazadeh et al. | 360/51 |
| 4,637,023 | 1/1987 | Lounsbury et al. | 371/38 |
| 4,876,616 | 10/1989 | Katsumata et al. | 360/53 |
| 4,899,232 | 2/1990 | Odaka et al. | 360/48 |
| 5,012,459 | 4/1991 | Odaka et al. | 360/32 |
| 5,134,529 | 7/1992 | Inazawa et al. | 360/48 |

FOREIGN PATENT DOCUMENTS

| | | |
|---|---|---|
| 3718566 | 12/1988 | Fed. Rep. of Germany . |
| 58109031 | 1/1985 | Japan . |
| 1-155568 | 6/1989 | Japan . |
| 1-158677 | 6/1989 | Japan . |
| 63280823 | 5/1990 | Japan . |

Primary Examiner—Robert W. Beausoliel, Jr.
Assistant Examiner—Norman Wright

[57] ABSTRACT

A magnetic recording/reproduction device is disclosed that records data while forming serially a plurality of recording tracks on a magnetic tape. Each of the plurality of recording tracks have a plurality of data blocks recorded of the same bit length. Each of these plurality of data blocks includes a track data indicating the number of the track to be recorded and a synchronizing data indicating a synchronizing signal. The magnetic recording/reproduction device includes circuits for extracting the synchronizing data and the track data from each of the data blocks reproduced immediately after recording, a circuit for counting the number of synchronizing data extracted from the read out data blocks, a circuit for detecting a time period interval of synchronizing data for each recording track, a circuit for extracting track data from the read out data blocks, and a circuit for comparing the extracted track data with an expected data for each recording track. A circuit for making determination whether each data block is correctly recorded onto a corresponding recording track is implemented to make determination of data being correctly recorded only when the outputs of the circuit for comparison, the circuit for detecting the time interval, and the circuit for counting satisfy a certain condition.

21 Claims, 5 Drawing Sheets

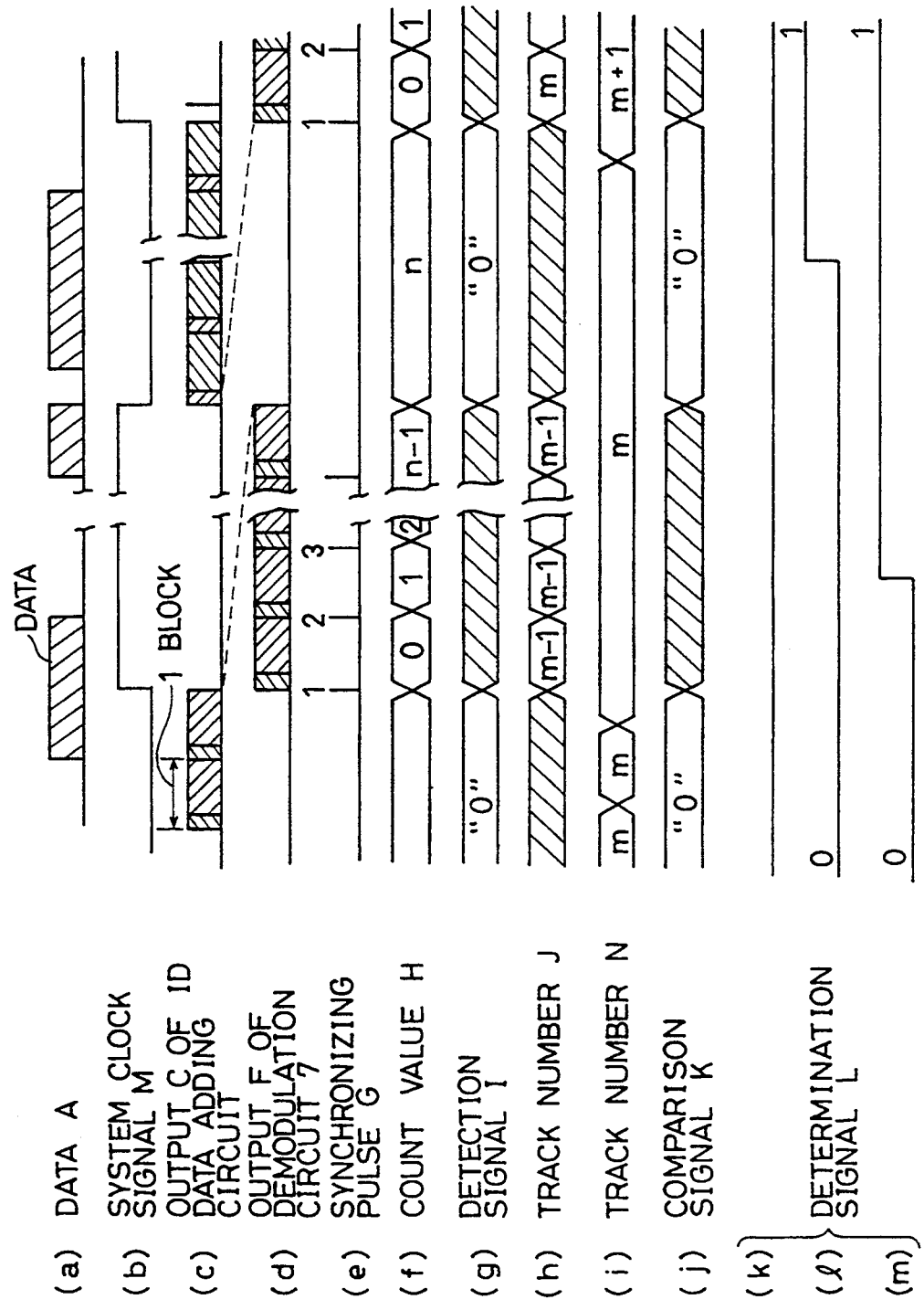

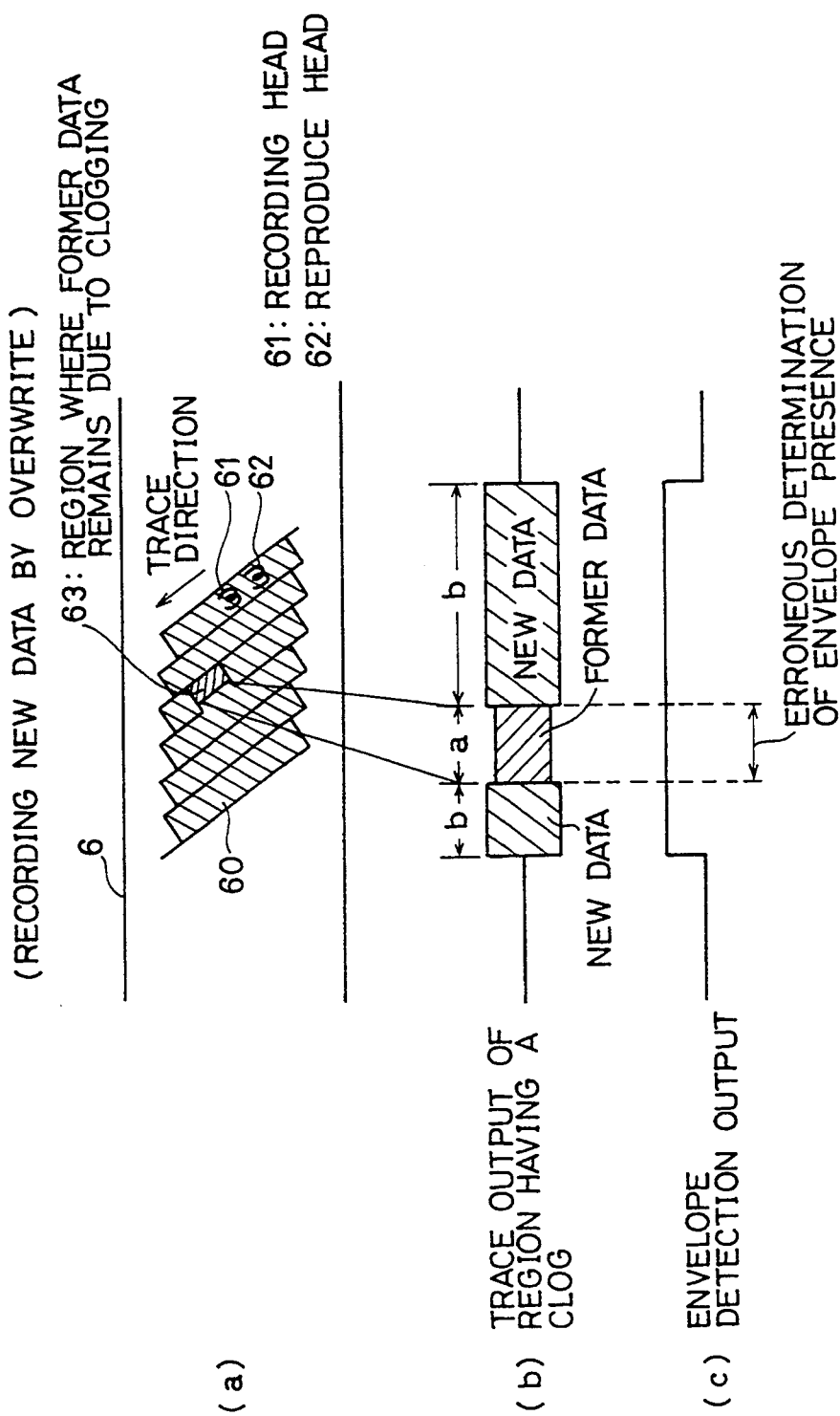

RECORDING/REPRODUCTION APPARATUS WITH ERROR DETECTION CAPABILITY

BACKGROUND OF THE INVENTION

1. Field of the Invention

The present invention relates to recording/reproduction devices, and more particularly, to a recording/reproduction device used as a storage device for storing data more accurately, such as the storage device of an information processing apparatus of computers.

2. Description of the Background Art

A digital audio tape recorder (referred to as DAT hereinafter) is a magnetic recording/reproduction device that records audio signals as digital data on a magnetic tape and reads out digital data from a magnetic tape. Such a DAT is used in data recording/reproduction devices for the backup of magnetic disc devices of computers accounting for its large recording capacity and low cost of bit storage. The necessity of recording data onto the magnetic tape of the DAT without an error is vital to DATs used for backup due to the functional characteristics of computers. The following methods are employed to improve the accuracy of recording data in DATs.

An intricated error correction code (parity bit) is added for each predetermined bit length of data applied to a DAT. This error correction code is recorded in a magnetic tape as a digital data along with the actual data to be recorded. At the time of data reproduction of that tape, the error correction code added at the time of recording is detected from the data read out from the magnetic tape. Determination is made whether there is an error in the recorded data excluding the error correction code (the actual recorded data), and the position of the error bit in the reproduced data is detected, according to the detected error correction code. When there is some error in the reproduced data, the data of the bit having its position detected on the basis of the error correction code is corrected to a proper data. Thus, the recorded data in a DAT can be improved in accuracy because an erroneous data recorded in a magnetic tape is corrected at the time of data reproduction.

For the purpose of improving accuracy of recorded data in a DAT by correcting erroneous recorded data at the time of data recording, a method of data recording called the read-after-write method is employed which reads data right after its recording to verify whether the data is properly recorded or not according to the read data. This data recording of the read-after-write method is implemented by a reproduce head tracing a recording track on the magnetic tape following a recording head at the time of data recording. Since data is recorded on the recording track traced by a recording head, the reproduce head tracing the recording track right after the recording head will read out the data recorded immediately before. It can be verified whether data is correctly recorded on the magnetic tape or not according to the data read out by the reproduce head. If the data is not recorded correctly on the magnetic tape, the data applied to the recording head is controlled so that the recording head will record the same data again on the magnetic tape. If data is correctly recorded on the magnetic tape, the data applied to the recording head is controlled so that the recording head will record on the magnetic tape new data. Thus, data will always be recorded correctly on the magnetic tape.

The following methods of determining whether there is an error in the recorded data according to the data read out by a reproduce head in the read-after-write method are described.

An error correction code (parity bit) is added in advance to the data to be recorded, so that this error correction code is detected from the data read out by the reproduce head. Detection is made whether there is an error in the data recorded actually on the magnetic tape, and also the position of the erroneous bit if any, according to the detected error correction code. If there is an error in the data actually recorded on the magnetic tape, the recording head will trace again the area where the erroneous data is recorded. At this time, identical data is applied to the recording head so that the record data on the magnetic tape is rewritten with the correct data.

According to the above described method of using an error correction code, determination is made that there is an error in the recorded data in the case where a portion of data is not at all recorded on a magnetic tape. This is because the output of the reproduce head tracing the region where data is not recorded on the magnetic tape differs from that corresponding to the actual record data. The recording head will trace again the portion where that data is not recorded to carry out accurate data recording. Therefore, correct data can be recorded again on a magnetic tape when there is a missing portion in the data on a magnetic tape, or when erroneous data is recorded on a magnetic tape. A method of verifying whether there is a missing portion on the data recorded on a magnetic tape comprises a method of verifying the envelope of the output signal of the reproduce head (referred to as reproduction signal hereinafter). This method will be described briefly hereinafter.

Digital recording onto a magnetic tape is carried out by positively or negatively magnetizing a magnetic tape, using a recording head, corresponding to binary data of logic values 1 or 0 to be recorded. When the reproduce head traces the magnetized portion on the magnetic tape, voltage is induced in the coil of the reproduce head by magnetic flux leaking out from the magnetic tape. The polarity of the voltage induced in the coil of the reproduce head changes in response to the change of the magnetization polarity of the magnetic tape. The voltage induced in the coil of the reproduce head is the output signal, i.e. the reproduced signal of the reproduce head. The reproduced signal obtained from the region where data is recorded on the magnetic tape shows change in polarity according to the alignment of logic values 1 and 0 of the recorded data to indicate a continuous envelope. The region not having data recorded is not magnetized, so that voltage of either plurality will not be induced in the coil of the reproduce head tracing that region. In the continuous detection of the envelope of the reproduced signal from the reproduce head at the time of data recording of the read-after-write method, the envelope of the reproduced signal will be interrupted corresponding to the time period where the reproduce head is tracing the area where data is not recorded. It is therefore appreciated that the area thereof does not have data recorded. In the case of interruption in the detected envelope according to the continuous detection of the envelope of the reproduced signal, the recording head traces again the area where data is missing on the magnetic tape to re-record the missing data.

The envelope of a reproduced signal is detected by an analog circuit called an envelope detector implemented with a rectifying circuit for full-wave rectification of an input signal, and a low-pass filter for smoothing the output of the rectifying circuit.

The generation of a region where data is not recorded in a magnetic tape which the recording head is tracing occurs, for example, when a foreign substance is introduced into the gap portion of the recording head to temporarily clog the gap portion of the recording head. At the time of data recording, a recording current is provided in the coil of the recording head having the polarity controlled in response to the alignment of logic values 1 and 0 of the recording data to magnetize the magnetic tape. This generates a magnetic field in the gap portion of the recording head, having an intensity sufficient to magnetize the magnetic layer of the surface of the magnetic tape. If the gap portion of the recording head becomes clogged, data recording can not be carried out since a magnetic field of sufficient intensity is not applied to the magnetic tape from the gap portion of the recording head even though recording current is flowing to the coil of the recording head.

There are cases where the data recording of the read-after-write method is employed in a magnetic recording/reproduction device that has to record data very accurately. In such a case, the above described methods of using an error correction code or detecting the envelope of a reproduced signal are employed for verifying the recorded data according to the reproduced signal obtained at the time of data recording. However, the method using an error correction code requires complicated circuitry including a circuit for detecting an error correction code from the reproduced data obtained from a reproduced signal, a circuit for detecting the position of the erroneous data recorded on the magnetic tape according to the detected error correction code, and a circuit for controlling data to be applied to a recording head for recording the proper data on the area where the erroneous data was recorded on the magnetic tape. The method of using an error correction code will increase the circuit complexity in a magnetic recording/reproduction device and the cost thereof.

The method of detecting an envelope of a reproduced signal can be realized by a relatively simple analog circuit, as mentioned above. This method will not induce increase in circuit complexity or cost. However, this method capable of detecting missing recorded data can not detect an error in the recorded data. This gives rise to the following problems.

A case is assumed where data already recorded on a magnetic tape (referred to as former data hereinafter) is rewritten by a new data without erasing the former data, by tracing the recording track where the former data is recorded with a recording head receiving a recording signal corresponding to data to be newly recorded. This data recording method is called the overwrite method. FIG. 7 schematically shows an output of a reproduce head and the envelope thereof when the recording head is temporarily clogged in recording data according to the overwrite method and the read-after-write method in a magnetic recording/reproduction device of R-DAT method.

Since a rotary head is used for both the recording head and the reproduce head in the R-DAT method, a plurality of recording tracks 60 parallel to each other and oblique to the longitudinal direction of a magnetic tape 6 are formed on magnetic tape 6, as shown in FIG. 7(a). At the time of data recording by the read-after-write method, a recording head 61 and a reproduce head 62 sequentially trace each recording track 60. If there is no clog in recording head 61, the record data of the region traced by recording head 61 shows the new data. The output signal of reproduce head 62 tracing this region corresponds to that of the new data. If recording head 61 is temporarily clogged to generate a period in recording track 60 where new data can not be recorded, the data in the region 63 traced by recording head 61 during this period maintains the former data since it is not rewritten with new data. Therefore, the output signal of reproduce head 62 tracing this region corresponds to that of the former data.

The output signal of reproduce head 62, therefore, corresponds to that of the new data during the period where there is no clog in recording head 61, and corresponds to that of the former data during the period where there is a clog in reproduce head 61. (See FIG. 7 (b)). The region 63 traced by recording head 61 during the period where there is a clog in recording head 61 should be detected as a region where data is not recorded correctly. However, region 63 has the former data recorded. The output signal of reproduce head 62 tracing region 63 will show a continuous envelope similar to that of the reproduced signal of reproduce head 62 tracing other regions, i.e. the regions where new data is recorded. The envelope of the output signal of reproduce head 62 is not interrupted during period "a" where there is a clog in recording head 61 which is similar to that of period "b" where there is no clog in recording head 61, as shown in FIG. 7(c). Region 63 having the former data recorded is erroneously determined as having new data recorded. Therefore, the recorded data of region 63 is eventually not correct.

In the case where two rotary heads are used as the recording head, the two recording heads alternately trace recording track 60. For the purpose of preventing crosstalk between adjacent recording tracks 60, the trace angle (azimuth) of the gap portion of one of the two rotary heads for recording a track 60 is designed to be different from that of the other rotary head. It is therefore necessary to trace each recording track with a reproduce head having an azimuth identical to that of the recording head tracing that track at the time of data recording to read a signal recorded in that recording track 60. Accordingly, two rotary heads are used for the reproduce head each having an azimuth identical to that of the respective rotary heads of the recording heads. The two rotary heads alternately trace recording tracks 60 to read a signal. The probability of obtaining a reproduced signal corresponding to the former data from reproduce head 62 tracing region 63 where the former data is recorded as shown in FIG. 7(a) is ½.

If the azimuth of the recording head having traced region 63 for recording of the former data into region 63 coincides with that of reproduce head 62 tracing region 63 during recording of new data, a reproduced signal is obtained from reproduce head 62 even during the period where there is a clog in recording head 61. In this case, erroneous determination is made that region 63 actually having the former data recorded has the new data recorded correctly, as described above. If the azimuth of the recording head having traced region 63 during recording of the former data differs from that of reproduce head 62 tracing region 63 during recording of the new data, a reproduced signal is not obtained during the period where there is a clog in recording head 61. In this case, determination is made that the new data is not correctly recorded in region 63, since the envelope of the reproduced signal is interrupted during the period where reproduce head 62 traces region 63 having the former data recorded. According to the method of detecting an envelope of a reproduced signal, a clog in recording head 61 can be detected with a probability of only 50% even in the case where two rotary heads are used for the recording head and the reproduce head respectively.

In the case of data recording by the so-called update-in-place method that selectively rewrites a portion of an already recorded data to a new data, the recording track to be recorded with a new data is traced by a recording head and a reproduce head having an azimuth identical to that of the recording head used in writing the former data therein. In this case, reproduce head 62 tracing region 63 having the former data recorded definitely provides a reproduced signal corresponding to the former data. Therefore, the probability of region 63 having the former data recorded being detected as a portion not having the new data recorded correctly is 0%.

According to the method of making determination whether data is recorded correctly on a magnetic tape using the envelope of a reproduced signal, it is not possible to detect with high accuracy a clog in a recording head occurring at the time of data recording with the overwrite method, for example.

SUMMARY OF THE INVENTION

An object of the present invention is to provide a recording/reproduction device that can detect an error in recorded data with high accuracy.

Another object of the present invention is to provide a recording/reproduction device that can detect an error in a recorded data with high accuracy without increasing circuit complexity.

A further object of the present invention is to provide a recording/reproduction device that can detect an error in a recorded data with high accuracy without increasing the cost of the device.

Yet a further object of the present invention is to provide a recording/reproduction device that can detect an error in a recorded data with high accuracy without increasing circuit complexity and cost of the device.

Yet another object of the present invention is to provide a recording/reproduction device that can detect an error in a recorded data with high accuracy at the time of data recording by the overwrite method and the read-after-write method.

Yet a still further object of the present invention is to provide a recording/reproduction device that can detect an error in a recorded data with high accuracy at the time of data writing by the overwrite method and read-after-write method without increasing circuit complexity and cost of the device.

In order to achieve the above objects, a recording/reproduction device according to the present invention includes a recording circuit for serially recording a predetermined number of data blocks in each of a plurality of recording tracks using a recording medium having a plurality of recording tracks, a reproducing circuit for reading and reproducing a recorded data from a recording track right after the data is recorded by the recording circuit into the recording track, and a count circuit for counting the number of data blocks included in the data read and reproduced from a recording track by the reproducing circuit. Each data block includes additional information as well as information to be actually recorded. The additional information includes track data indicating the recording track in which the data block is to be recorded, position data indicating a predetermined position in the data block, etc. The recording/reproduction device according to the present invention extracts such additional information from the reproduced data to make determination whether the predetermined number of data blocks are all correctly recorded or not in a recording track according to the extracted additional information and the number of data blocks counted by the count circuit.

More specifically, in addition to the recording circuit, the reproducing circuit, and the count circuit, the recording/reproduction device of the present invention includes a position data extracting circuit for extracting position data from each data block included in the data read and reproduced for every recording track by the reproducing circuit, a detecting circuit for detecting the recorded position of each data block in a recording track according to the extracted output of the position data extracting circuit, and a determination circuit for making determination whether the predetermined number of data blocks are all correctly recorded in the recording track according to the recorded position detected by the detecting circuit and the number of data blocks counted by the count circuit.

In addition to the recording circuit, the reproducing circuit, and the count circuit, the recording/reproduction device according to another aspect of the present invention includes a track data extracting circuit for extracting track data from each data block in the data read and reproduced for every recording track by the reproducing circuit, and a determination circuit for making determination whether the predetermined number of data blocks are correctly recorded in the recording track according to the extracted track data from the track data extracting circuit and the number of data blocks counted by the count circuit.

In addition to the recording circuit, the reproducing circuit, and the count circuit, the recording/reproduction device according to a further aspect of the present invention includes both the track data extracting circuit and the position data extracting circuit. The recording/reproduction device of this aspect further includes the above-described detecting circuit, and a circuit for making determination whether the predetermined number of data blocks are all correctly recorded in the recording track according to at least three types of information including the recording position detected by the detecting circuit, the number of data blocks counted by the count circuit, and the track data extracted by the track data extracting circuit.

The recording/reproduction device of the present invention having any of the above-described structures makes determination whether a predetermined number of data blocks are all correctly recorded in each recording track according to the number of data blocks recorded in each recording track and according to each track data of the data blocks recorded in each recording track and/or the recorded position of each data block in the recording track.

If there is data missing in a region of the recording track right after data recording due to some reason, the number of data blocks in the data read out and reproduced by the reproducing circuit from the recording track is less in number than the predetermined number. Therefore, determination can be made that the predetermined number of data blocks are not correctly recorded in the recording track by the count circuit when there is data missing in the recording track.

In data recording by the overwrite method where a new data is recorded on a recording track where the former recorded data was not erased and a portion of the former recorded data on the recording track is not rewritten by a new data, the count circuit will also count the number of data blocks in the former data. Therefore the number of data blocks counted by the count circuit will coincide with the predetermined number. However, the probability of the recorded pattern of the former data completely matching the recording pattern of the new data in the magnetic recording medium is extremely low considering the mechanical characteristics of the magnetic recording medium and the recording circuit at the time of data recording. More specifically, the recorded position of the data blocks forming the former data on the magnetic tape slightly differs from the recording position of the data blocks forming the new data on the magnetic tape. The probability of a track data of the data block forming the former data matching the track data of the data block forming the new data is also very low. In this case, the outputs of the detecting circuit and the track data extracting circuit corresponding to the data reproduced from the region where the former data is left recorded will differ from the outputs of the detecting circuit and the track data extracting circuit corresponding to the data reproduced from the region where new data is recorded, respectively. The determination circuit can make determination that the new data is not correctly recorded on the recording track by at least either of the outputs of the track data extracting circuit and the detecting circuit.

According to the present invention, the data right after being recorded on a recording medium is read out from the recording medium, whereby determination is made whether the data to be recorded is correctly recorded on the recording medium according to the continuation of additional data such as position data and track data added in advance to the recorded data, and the number of data blocks recorded in each recording track, at the time of data recording. As a result, erroneous recorded data can be detected more accurately than in conventional systems. The accuracy of recorded data in a recording/reproduction device is significantly improved since data can be recorded more accurately in a recording medium.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only and thus are not limitative of the present invention, and wherein:

FIG. 3 is a timing chart for explaining the operation of the magnetic recording/reproduction device of FIG. 1.

FIG. 7 is a diagram for explaining the operation to detect erroneous recorded data in a conventional R-DAT magnetic recording/reproduction device.

DETAILED DESCRIPTION OF THE PREFERRED EMBODIMENTS

Figure 1:
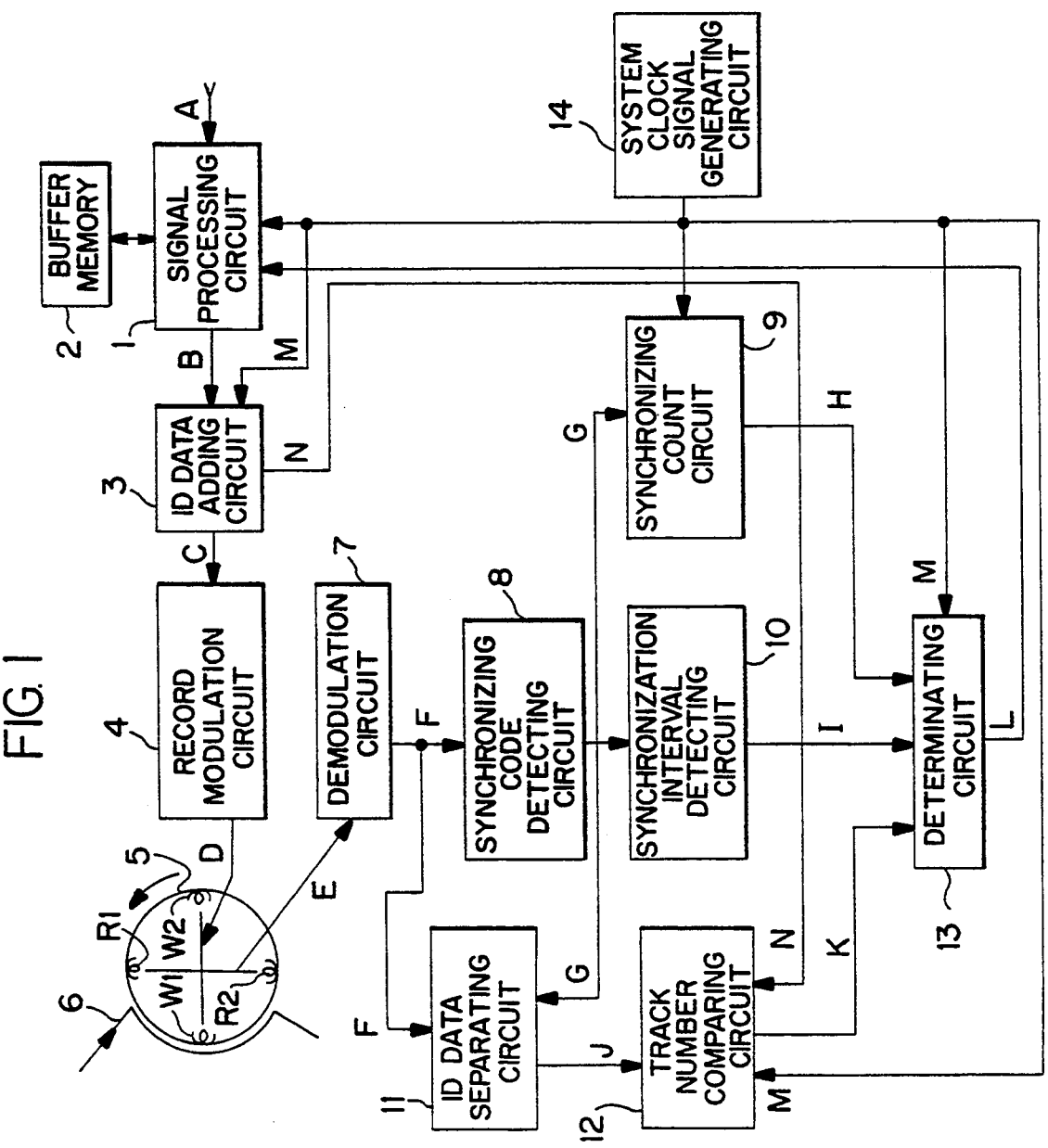
FIG. 1 is a block diagram showing a structure of the signal processing system of an R-DAT magnetic recording/reproduction device according to an embodiment of the present invention.

FIG. 1 is a block diagram showing a structure of a signal processing system for recording and reproducing data in a R-DAT magnetic recording/reproduction device according to an embodiment of the present invention.

Referring to FIG. 1, recording data on a magnetic tape 6 is carried out by two recording heads W1 and W2 attached to a rotary drum 5. Reading data from magnetic tape 6 is carried out by reproduce heads R1 and R2 attached to rotary drum 5 corresponding to recording heads W1 and W2, respectively. Magnetic tape 6 is wound around rotary drum 5 at a predetermined angle. Recording heads W1 and W2 separated 180° from each other are attached at the periphery of rotary drum 5. In a similar manner, reproduce heads R1 and R2 separated 180° from each other are attached at the periphery of rotary drum 5. The attached position of recording heads W1 and W2 differs from that of reproduce heads R1 and R2 by a predetermined angle. The travel of magnetic tape 6 and the rotation of rotary drum 5 are controlled by a servo system not shown.

The operation of data recording by the read-after-write method of this magnetic recording/reproduction device will be explained hereinafter.

At the time of data recording, data A to be recorded in magnetic tape 6 is applied to a signal processing circuit 1. Data A is provided from an information processing apparatus (not shown) of a computer for example. Signal processing circuit 1 receives data A to provide the same to a buffer memory 2. Buffer memory 2 temporarily stores data A applied via signal processing circuit 1. Signal processing circuit 1 reads out the temporarily stored data A from buffer memory 2 to provide the same divided into a plurality of blocks of a predetermined bit length to an ID data adding circuit 3 in synchronism with a system clock signal M from a system clock signal generating circuit 14.

In synchronism with system clock signal M, ID data adding circuit 3 adds to the head of each block of data provided from signal processing circuit 1 data comprising address information indicating the position of that data block recorded in magnetic tape 6 (referred to as ID data or identification data hereinafter) and data corresponding to the synchronizing signal (referred to as synchronizing code hereinafter). Each data block C having ID data and a synchronizing code added is applied to a record modulation circuit 4.

The above operation of this magnetic recording/reproduction device will be explained in detail with reference to FIG. 3. FIG. 3 is a timing chart showing the operation of the magnetic recording/reproduction device at the time of data recording of the read-after-write method.

Magnetic tape 6 and rotary drum 5 travel and rotate in the directions indicated by the arrows in FIG. 1. At the time of data recording of the read-after-write method, the region traced by recording head W1 in magnetic tape 6 is subsequently traced by reproduce head R1. The region traced by recording head W2 in magnetic tape 6 is subsequently traced by reproduce head R2.

A case is assumed where a series of data is applied at an arbitrary timing, as shown in FIG. 3(a) to signal processing circuit 1. In this case, data is stored in buffer memory 2 at the arbitrary timing. During the time period where system clock signal M (FIG. 3(b)) is at a predetermined level (L level here), signal processing circuit 1 reads out the data from buffer memory 2 to divide the read out data into blocks of a predetermined bit length. Because system clock signal generating circuit 14 provides a clock signal M of a constant cycle, as shown in FIG. 3(b), signal processing circuit 1 provides data B divided into blocks at a constant timing regardless of the timing of data A applied to signal processing circuit 1. Therefore, data blocks each of a constant bit length having ID data and a synchronizing code added are provided from ID data adding circuit 3 at a constant timing, as shown in FIG. 3(c).

Record modulating circuit 4 modulates data C provided from ID data adding circuit 3 for every constant period into a signal having a format adaptable for recording on magnetic tape 6. The modulated signal is provided to recording heads W1 and W2. Thus, an externally applied data A is recorded on magnetic tape 6 as signal D modulated by record modulation circuit 4 under a block unit of the constant bit length. In the present embodiment, a predetermined number of data blocks are recorded in each recording track of magnetic tape 6.

Figure 2A:
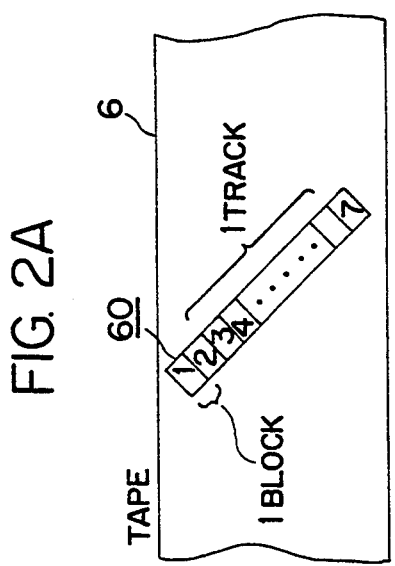
FIGS. 2A-2B indicates the data recording pattern on a magnetic tape in a magnetic recording/reproduction device of an embodiment according to the present invention.
Figure 2B:
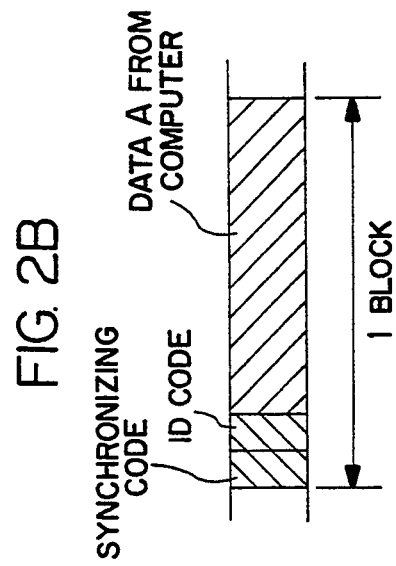

FIG. 2 shows a data recording pattern on a magnetic tape according to the present invention. Referring to FIG. 2(a), a predetermined number n of data blocks are serially recorded in recording track 60 on magnetic tape 6. Each data block has a synchronizing code and an ID data at its head portion, including the externally applied data A after the ID data.

In the present embodiment, the ID data added by ID data adding circuit 3 to data block B provided from signal processing circuit 1 is a number indicating which recording track that data block is recorded on magnetic tape 6. This number (referred to as the track number hereinafter) is incremented by 1 every time the n data blocks are provided from signal processing circuit 1 to ID data adding circuit 3. Therefore, the ID data added to each of the n data blocks to be recorded in the same recording track on magnetic tape 6 indicate the same track number. The ID data of a data block recorded in one of two arbitrary adjacent recording tracks and the ID data of the data block recorded in the other of the two recording tracks show a continuous track number.

Track number N added to each data block B from signal processing circuit 1 by ID data adding circuit 3 is also applied to a track number comparing circuit 12.

Reproduce heads R1, R2 and recording heads W1, W2 trace a recording track when system clock signal M is at a H level and a L level, respectively. The period of system clock signal M generated from system clock signal generating circuit 14 is set according to the travel speed of magnetic tape 6 and the rotation speed of rotary drum 5 so that a recording track traced by one of the recording heads W1 and W2 is immediately traced by a reproduce head R1 or R2 corresponding to the one recording head. In accordance with the above circuit operation, recording heads W1 and W2 record externally applied data A onto magnetic tape 6, followed by reproduce heads R1 and R2 tracing the portions traced by recording heads W1 and W2 to read out the signal recorded therein. Signal E read out by reproduce heads R1 and R2 is applied to a demodulation circuit 7.

Demodulation circuit 7 demodulates the read out signal E to return the same into a digital signal F in the format of the signal C before being modulated by record modulation circuit 4. Since reproduce heads R1 and R2 trace magnetic tape 6 when clock signal M is at a H level, digital signal F formed of n data blocks is provided from demodulation circuit 7 at a constant timing, as shown in FIG. 3(d). Digital signal F is applied to synchronizing code detecting circuit 8 and an ID data separating circuit 11.

Synchronizing code detecting circuit 8 detects the synchronizing code added at the time of recording from each of the n data blocks forming the applied digital signal F to output one synchronizing pulse in response to the detection. Therefore, one synchronizing pulse is provided from synchronizing code detecting circuit 8 for each time period corresponding to the bit length of one data block during the time when clock signal M is at a H level, as shown in FIG. 3(e). Since digital signal F serially output from demodulation circuit 7 includes n data blocks, the total number of synchronizing pulses provided from synchronizing code detecting circuit 8 during an H clock signal M is n. Synchronizing pulse G provided from synchronizing code detecting circuit 8 is provided to a synchronizing count circuit 9, a synchronization interval detecting circuit 10, and an ID data separating circuit 11.

Synchronizing count circuit 9 counts the number of the applied synchronizing pulse G to provide a count value H to determination circuit 13 as a digital signal. Synchronizing count circuit 9 resets the count value to 0 in response to the rise of system clock signal M to a H level, and increments the count value by 1 in response to the fall of system clock signal M to a L level. Therefore, count value H provided to determination circuit 13 turns to 0 when synchronizing code detecting circuit 8 outputs a synchronizing pulse in response to the synchronizing code of the first data block out of the n data blocks from demodulation circuit 7 at the time of the rise of clock signal M, as shown in FIG. 3(f). Thereafter, count value H is incremented by 1 every time synchronizing code detecting circuit 8 provides a new synchronizing pulse during the time period clock signal M is at a H level. Count value H of synchronizing count circuit 9 becomes n−1 in response to a synchronizing pulse provided from synchronizing code detecting circuit 8 in response to the synchronizing code of the last data block out of the n data blocks from demodulation circuit 7. Count value H is then incremented to become n in response to the fall of clock signal M right after the above-mentioned last pulse is generated. Value n of this count value H is maintained until clock signal M rises again to a H level. Synchronizing count circuit 9 counts the total number of the recorded synchronizing codes, i.e. the number of data blocks recorded therein, for each recording track in magnetic tape 6.

Synchronization interval detecting circuit 10 continuously detects the length of the time period from the output of one synchronizing pulse to the output of the next synchronizing pulse from synchronizing code detecting circuit 8. When digital signal F provided from demodulation circuit 7 during the time period when clock signal M attains a H level is formed of data blocks of a constant bit length, the interval of the synchronizing pulses provided from synchronizing code detecting circuit 8 is a constant time period $\tau$ corresponding to the aforementioned constant bit length. Synchronization interval detecting circuit 10 provides a digital detection signal of logic value 0 when the detected period length is equal to the constant time period $\tau$, and a digital detection signal of logic value 1 when the length of detected period is different from time period $\tau$.

In the present embodiment, synchronization interval detecting circuit 10 provides a digital detection signal of logic value 0 during the time period clock signal M is at a L level, i.e. during the time period digital signal F is not provided from demodulation circuit 7. Therefore, digital detection signal I indicates logic value 0 during the time period digital signal F is not provided from demodulation circuit 7, as shown in FIG. 3(g). During the time period digital signal F is provided from demodulation circuit 7, detection signal I indicates logic value 0 if the bit length of each of the n data blocks forming digital signal F is equal to the aforementioned constant bit length. If any of the bit length of the n data blocks differs from the aforementioned constant bit length, detection signal I is inverted to logic value 1 at the time a synchronizing pulse corresponding to the synchronizing code of a data block succeeding the data block having the different bit length is provided from synchronizing code detecting circuit 8. Detection signal I provided from synchronization interval detecting circuit 10 is applied to determination circuit 13.

ID data separating circuit 11 separates the track number added as an ID data from each of the n data blocks forming digital signal F provided from demodulation circuit 7. The separated track number J is provided to track number comparing circuit 12.

Track number comparing circuit 12 operates only during the time period when clock signal M is at a H level to compare the value of track number J provided from ID data separating circuit 11 and the value of track number N provided from ID data adding circuit 3. If the value of track number J is equal to a value that is −1 of the value of track number N, track number comparing circuit 12 provides a digital comparison signal K of logic value 0 to determination circuit 13. If the value of track number J is not equal to a value that is −1 of the value of track number N, track number comparing circuit 12 provides a digital comparison signal K of logic value 1 to determination circuit 13.

ID data adding circuit 3 adds the same track number to each of the n data blocks to be recorded on the same recording track in magnetic tape 6. Therefore, the value of track number N provided from ID data adding circuit 3 indicates a constant value m during the time period n data blocks to be recorded on the same recording track are provided from signal processing circuit 1 (during the time period clock signal M is at a L level) and the time period until n data blocks to be recorded in a recording track succeeding the aforementioned same recording track begins to be provided from signal processing circuit 1 (during the time period clock signal M is at a H level), and shows a value of m+1 during the time period the next n data blocks are provided from signal processing circuit 1, as shown in FIG. 3 (i). The value of track number N is maintained at m+1 until the next n data blocks to be recorded in the further succeeding recording track are provided from signal processing circuit 1, as shown in FIG. 3 (i). The value of track number N is incremented by 1 for every time period of one cycle of clock signal M.

Demodulation circuit 7 reproduces the data, recorded in magnetic tape 6 during the time period clock signal M is at a L level, when clock signal M attains a H level following the aforementioned time period of L level. Therefore, when clock signal M is at a H level, the value of track number J provided from data F reproduced by demodulation circuit 7 shows the track number of the data block recorded in the recording track during the time period clock signal M is at a L level right before that period of clock signal M attaining a H level, as shown in FIG. 3 (h). Accordingly, the value of track number J is always 1 lower value than the value of track number N.

Digital comparison signal K always indicates logic value 0 during the time period digital signal F is provided from demodulation circuit 7, as shown in FIG. 3(j). If there is a data block having a track number that does not match one lower value of the value of track number N in the data reproduced from the same recording track due to some reason, comparison signal K is inverted to logic value 1 in response to this track number separated from the data block being provided to track number comparing circuit 12. Similar to synchronization interval detecting circuit 10, track number comparing circuit 12 provides a digital signal K of logic value 0 to determination circuit 13 during the time period digital signal F is not provided from demodulation circuit 7.

Figure 4:
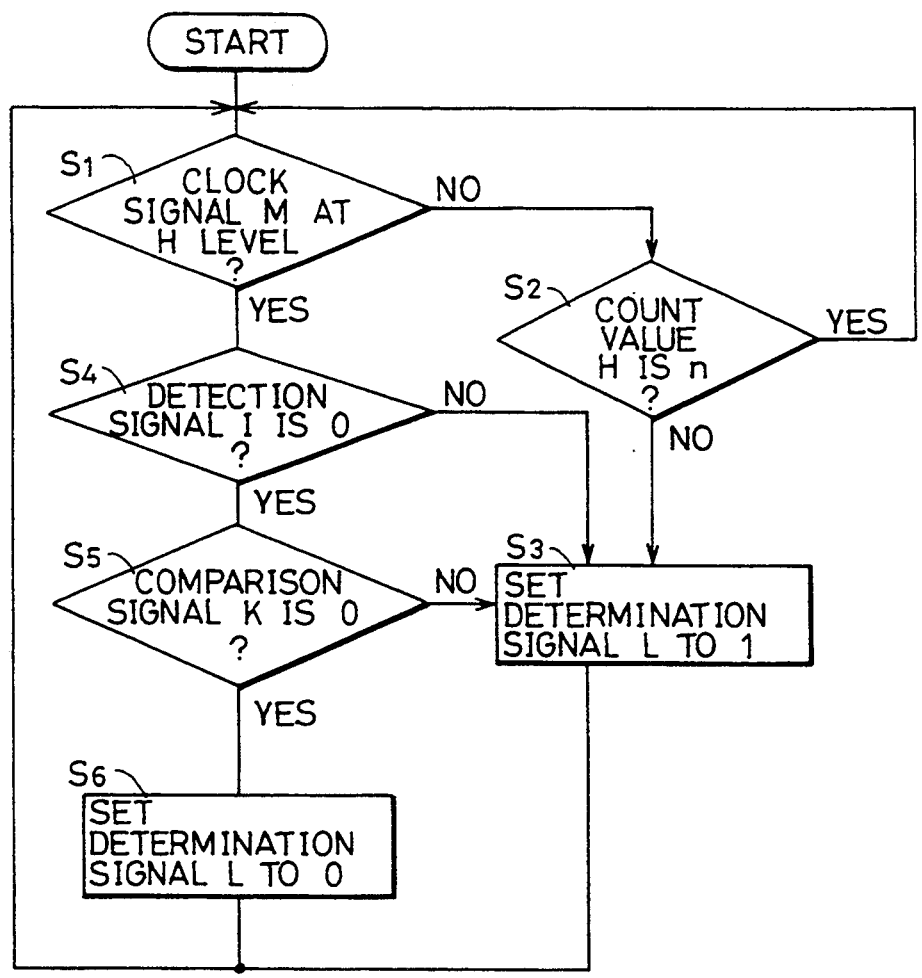
FIG. 4 is an operation flow chart for explaining the operation of the determinating circuit of FIG. 1.

The operation of determination circuit 13 will be explained hereinafter with reference to FIG. 4. FIG. 4 is a flow chart showing the operation of determination circuit 13.

Determination circuit 13 first makes determination whether clock signal M is at a H level or not (operation step S1 in FIG. 4). If clock signal M is at a L level, determination circuit 13 makes determination whether count value H of synchronizing count circuit 9 matches n or not (operation step S2 in FIG. 4). If all the n data blocks are recorded into a recording track of magnetic tape 6 during the time period of clock signal M at a L level, count value H shows a value of n during the time period clock signal M next attains a L level. If any of the n data blocks to be recorded during the time period of clock signal M at a L level is not recorded on magnetic tape 6, the count value H shows a value lower than n during the time period clock signal M next attains a L level. If count value H matches the number of data blocks n to be recorded on each recording track, determination circuit 13 carries out the determination operation of operation step S1 again. If count value H does not match n, determination circuit 13 provides a digital determination signal L of logic value 1 to signal processing circuit 1 (operation step S3 in FIG. 4). During the time period until reproduce heads R1 or R2 begin to read out from magnetic tape 6 the immediately previous recorded data, determination circuit 13 makes determination whether all the n data blocks are recorded into a recording track immediately proceeding the current recording track having data recorded, according to count value H of synchronizing count circuit 9.

When clock signal M attains an H level, determination circuit 13 makes further determination whether detection signal I from synchronization interval detecting circuit 10 shows logic value 0 or not (operation S4 of FIG. 4). If detection signal I shows logic value 0, determination circuit 13 makes determination whether comparison signal K from track number comparing circuit 12 shows logic value 0 or not (operation step S5 in FIG. 4). If detection signal I shows logic value 1, determination circuit 13 provides determination signal L of logic value 1 to signal processing circuit 1 (the aforementioned operation step S3).

If all the data blocks forming data F reproduced from magnetic tape 6 during the time period of clock signal M at a H level have the same bit length, detection signal I shows logic value 0. If any of the data blocks have a bit length differing from that of the other data blocks, detection signal I indicates logic value 1. Therefore, determination circuit 13 makes determination whether the n data blocks recorded in the recording track immediately before are formed of data blocks having the same bit length at operation step S4. If there is not a data block having a different bit length in the reproduced n data blocks, determination circuit 13 executes the following determination operation (the aforementioned operation step S5).

At step S5, if comparison signal K shows logic value 0, determination circuit 13 provides a determination signal L of logic value 0 to signal processing circuit 1 (operation step S6 in FIG. 4). If comparison signal K indicates logic value 1, determination circuit 13 provides a determination signal L of logic value 1 to signal processing circuit 1 (operation step S3). If the same track number is added to all the data blocks in the data reproduced from the recording track during the time period clock signal M is at a H level, comparison signal K indicates logic value 0. If any of the data blocks have a track number different from that of the other data blocks, comparison signal K indicates logic value 1. That is, at operation step S5, determination circuit 13 makes determination whether the n data blocks recorded right before in the recording track are formed of data blocks having the same track number added.

On termination of operation steps S3 or S6, the operation of determination circuit 13 returns to operation step S1. Thus, determination circuit 13 repeats the above described series of determination operation and the decision of the logic value of determination signal L.

Since determination circuit 13 operates as described above, determination signal L indicates logic value 0 only when data recorded in each recording track includes n blocks, and when the data is formed of data blocks having the same bit length and the same track number added (when count value H matches predetermined value n, and detection signal I and comparison signal K both indicate logic value 0). In the above case, determining signal L shows logic value 0 regardless of clock signal M attaining a H or a L level, as shown in FIG. 3(k).

If the number of data blocks actually recorded in each recording track differs from the number of n data blocks to be recorded, the logic value of determination signal L is inverted to 1 during the time period clock signal M is at a L level (refer to FIG. 3(l)). Similarly, if any of the data blocks recorded in each recording track has a bit length differing from that of a predetermined length, or if the same track number is not added to all the data blocks recorded in each of the recording tracks, the logic value of determination signal L is inverted to 1 during the time period clock signal M is at a H level (refer to FIG. 3(m)).

Determinating circuit 13 is implemented with a microcomputer and the like operating according to a process program such as that shown in the flow chart of FIG. 4.

Determination signal L provided from determinating circuit 13 controls the signal processing operation of signal processing circuit 1.

If the logic value of determination signal L is 0, signal processing circuit 1 applies a new data block to ID data adding circuit 3. If the logic value of determination signal L is 1, signal processing circuit 1 provides again to ID adding circuit 3 the data block identical to the immediate preceding data block. As a result, the same data will be recorded again into the recording track which is traced by recording heads W1 or W2 right before. Therefore, if n data blocks are correctly recorded in the recording track, count value H, detection signal I, and comparison signal K corresponding to the data read out after the re-recording show predetermined value n, logic value 0, and logic value 0, respectively. If data is correctly recorded into a recording track by re-recording, the logic value of output signal L of determinating circuit 13 is inverted to 0 so that the next data block is provided from signal processing circuit 1.

Thus, the next data block is not provided from signal processing circuit 1 until the output signal L of determinating circuit 13 shows a logic value of 0. Therefore, each recording track of magnetic tape 6 can reliably have n data blocks recorded.

The operation of the magnetic recording/reproduction device will be considered where there is a temporary clog in recording head W1 or W2 during recording data onto magnetic tape 6 having no previous data recorded. In this case, no data is recorded in the region of the recording track traced by recording head W1 or W2. Therefore, data F obtained from the output signal E of reproduce head R1 or R2 tracing that region contains a plurality of data blocks less in number than the predetermined number n. Therefore, count value H of synchronizing count circuit 9 shows a value lower than n. In addition, since a synchronizing code is not detected from the region where nothing is recorded in this case, the interval between the two synchronizing pulses corresponding to the two synchronizing codes detected before and after the portion where nothing is recorded differs from the predetermined time period $\tau$. Detection signal I of synchronization interval detecting circuit 10 will show logic value 1. Therefore, the logic value of output signal L of determinating circuit 13 shows logic value 1 indicating to signal processing circuit 1 to provide the same data block again.

Thus, a temporary clog in recording head W1 or W2 at the time of recording data into a recording track having nothing recorded can be detected at a high probability by virtue of the outputs of synchronizing counter circuit 9 or synchronization interval detecting circuit 10.

Figure 5:
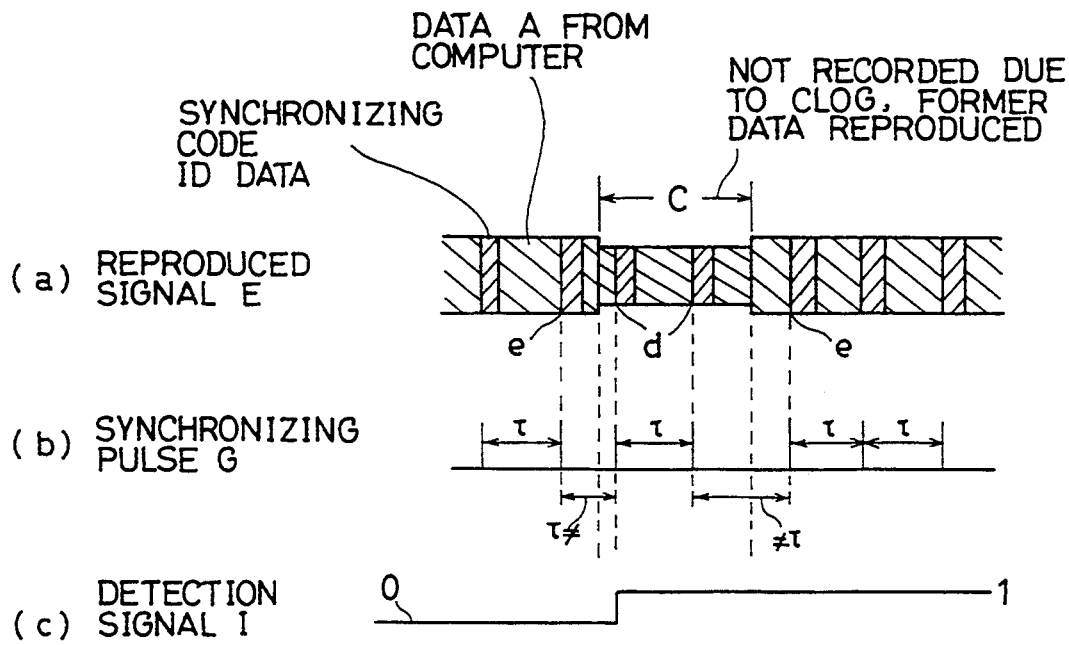
FIG. 5 is a timing chart for explaining the operation of a track number comparing circuit when there is a clog in the recording head at the time of overwriting.
Figure 6:
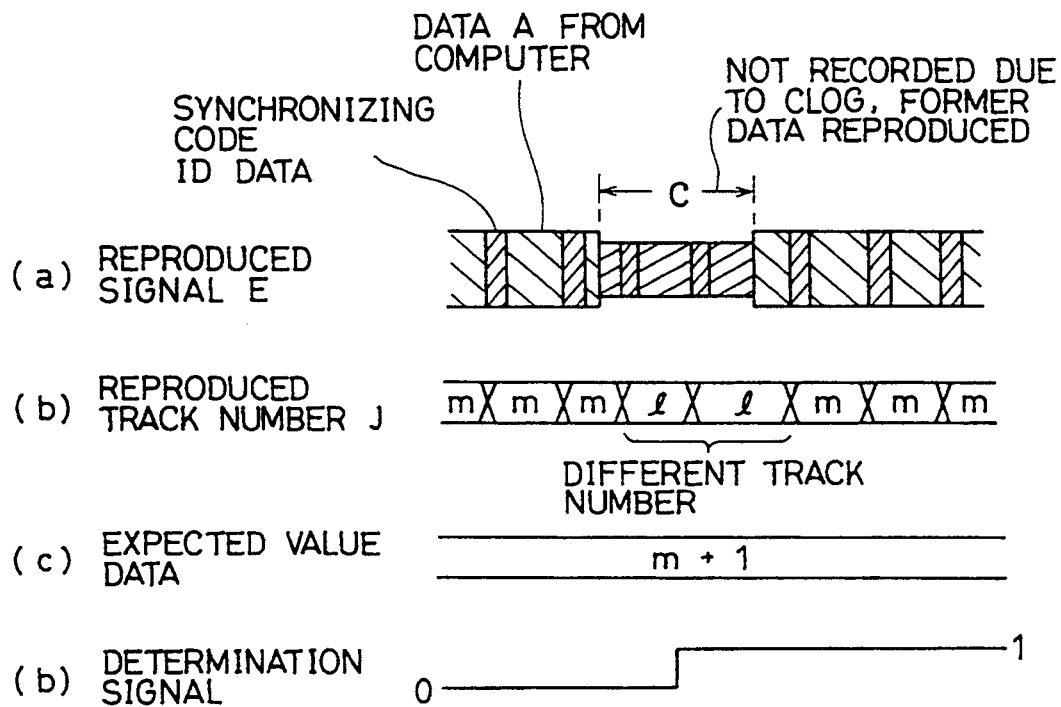
FIG. 6 is a timing chart for explaining the operation of a synchronization interval detecting circuit when there is a clog in the recording head at the time of overwriting.

The operation of the magnetic recording/reproduction device will be considered when there is a clog temporarily in recording head W1 or W2 in the case data already written onto magnetic tape 6 is rewritten with new data in the manner of "overwrite". This operation will be described with reference to FIGS. 5 and 6. FIGS. 5 and 6 are timing charts for explaining the operations of synchronization interval detecting circuit 10 and track number comparing circuit 12 when there is a temporary clog in recording head W1 or W2 at the time of overwrite.

A clog in a recording head at the time of overwrite will cause a portion of the data recorded onto the recording track traced by the recording head during the time period where the recording head has a clog left with the former data. Therefore the reproduced data F obtained from output signal E of reproduce head R1 or R2 tracing the recording track includes the former data having a bit length corresponding to the length of the time period where there is a clog in the recording head, as shown in FIGS. 5 (a) and 6(a).

The probability is very low for the actual data recorded pattern on the magnetic tape to be identical every time, due to the influence of mechanical conditions at the time of data recording such as variation in the travel speed of the magnetic tape, unevenness in the winding of the magnetic tape, change in the tension of the magnetic tape at the time of recording. Therefore, even if there was a clog in the recording head when recording new data onto a recording track having the former data recorded, with the former data remaining in a region of the recording track, the probability is very low for the timing of the former data to be completely identical to that of the new data that should have been recorded on the aforementioned region. More specifically, in the reproduced data obtained from the recording track (FIG. 5(a)), the interval between the starting position d of each former data block in region c corresponding to the time period where there is a clog in the recording head and the starting position e in each new data block preceding and succeeding region c is least likely to match time period $\tau$ corresponding to the bit length of one data block. Therefore, the synchronizing pulse provided from synchronizing code detecting circuit 8 corresponding to data reproduced from the recording track will have a constant interval equal to predetermined value $\tau$ during the time period where the new data is reproduced, and will have an interval different from that of the constant interval before and after data of region C where the former data is reproduced, as shown in FIG. 5(b). Therefore, the logic value of output I of synchronization interval detecting circuit 10 becomes 1 in response to a synchronizing pulse corresponding to a synchronizing code obtained from the region where the former data is recorded, as shown in FIG. 5(c).

Thus, a clog in a recording head can be detected by synchronization interval detecting circuit 10 when former data remains at a timing not matching the new data.

Furthermore, the track number is counted up from one same initial value every time data recording is commenced and added to each data block to be recorded. Therefore, the probability is very low for a data block having the same track number to be recorded every time into a region of a magnetic tape. In most cases, track number J provided from ID data separating circuit 11 corresponding to a reproduced data (FIG. 6(a)) obtained from a recording track having a region where the former data is left recorded shows different values during the time period a new data is reproduced and during the time period a former data is reproduced, as shown in FIG. 6(b). Track number N provided from ID data adding circuit 3 shows a value of m+1 which is greater by 1 than track number m obtained from the region where the new data is reproduced. Therefore, the track number to be compared with track number J from ID separating circuit 11 in track number comparing circuit 12 shows m regardless of the time period where a new data or a former data is reproduced, as shown in FIG. 6(c). The logic value of comparison signal K provided from track number comparing circuit 12 becomes 1 in response to the value of track number J showing a value l different from m when the reproduced data changes to the former data, as shown in FIG. 6(d).

Thus, a clog in a reproduce head is detected by track number comparing circuit 12 when the track number of the data currently recorded is different from that of the previous recorded data.

As described above, a temporary clog in a recording head occurring at the time of the overwriting is detected by synchronization interval detecting circuit 10 when there is an offset in the recording patterns of a former data and a new data on a magnetic tape, and is detected by track number comparing circuit 12 when the track number of the former data and that of the new data in the same recording track differ. Even when the recording pattern of the former data and that of the new data completely match, the logic value of output signal L of determinating circuit 13 becomes 1 in response to logic value 1 of output signal K of track number comparing circuit 12 if the track number of the former data and that of the new data in the same recording track differ. On the contrary, even when the track number of the former data coincides with that of a new data in the same recording track, the logic value of output signal L of determinating circuit 13 becomes 1 in response to logic value 1 of output signal I of synchronization interval detecting circuit 10 if there is an offset between the recording pattern of the former data and that of the new data. According to the above-described detections, new data will be rewritten into the recording track having a portion where the former data remains recorded.

Determination signal L of logic value 0 not indicating the rewrite of a new data from determinating circuit 13 is applied to signal processing circuit 1 only when the logic values of comparison signal K and detection signal I are both 0 and when count value H is a predetermined value n. The probability is very low for the logic value of determination signal L to remain 0 when there is a clog in the recording head at the time of overwrite.

Even if there is a clog in a recording head at the time of overwrite to result in a region in the recording track where new data is not recorded, the number of data blocks recorded in the recording track is the normal value n since the former data is still recorded in that region. Therefore, the logic values of comparison signal K and detection signal I should both be 0 for the logic value of determination signal L to become 1. Since the probability is very low for both the recording patterns of the former and new data to coincide and the track numbers of the former data and the new data to coincide, however, the case where the recording patterns of the former and new data coincide and the track numbers of the former and new data coincide is unlikely to occur. Therefore, when there is a clog in a recording head at the time of overwrite, a determination signal L of logic value 1 can be reliably provided from determination circuit 13 in response to comparison signal K or detection signal I.

Thus in the present embodiment, the detection of a missing data region on a magnetic tape is reliably carried out by synchronizing count circuit 9, and the detection of an erroneous data region on magnetic tape 6 due to a clog in the recording head at the time of overwrite is reliably carried out by synchronization interval detecting circuit 10 and track number comparing circuit 12. Thus, a clog in a recording head at the time of data recording can be detected with a considerably high probability in comparison with conventional systems so that data writing to a magnetic tape can be carried out more accurately.

It is understood from the above description that synchronizing count circuit 9 has a function similar to that of a conventional envelope detector. An envelope detector is implemented with an analog circuit, whereas synchronizing count circuit 9 may be implemented with a simple digital counter that counts synchronizing pulse G. According to the present invention, the detection of a data missing region can be realized using a circuit of a more simple structure. The circuit components for verifying a recorded data such as synchronizing code detecting circuit 8, synchronization interval detecting circuit 10, ID data separating circuit 11 and track number comparing circuit 12 can be implemented with a more simple digital circuit. According to the present invention, it is possible to record more accurately data into a recording medium without increasing the circuit complexity and the cost.

Although the present invention is described employed in a recording/reproduction device using a magnetic tape as a recording medium, the present invention is applicable to a recording/reproduction device using other recording media.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording/reproduction apparatus for recording data onto a recording medium having a plurality of recording tracks and for reading and reproducing the recorded data from said recording medium, comprising:
   recording means for serially recording a predetermined number of data blocks into each of said plurality of recording tracks, each of said predetermined number of blocks having a position data in a predetermined position;
   reproducing means for reproducing each data block recorded in said plurality of recording tracks by said recording means;
   count means for counting the number of said reproduced data blocks;
   position data extracting means for extracting said position data from each of said reproduced data blocks; and
   determination means, responsive to outputs of said count means and said position data extracting means, for determining whether said predetermined number of data blocks are correctly recorded in each of said plurality of recording tracks.

2. The recording/reproduction apparatus according to claim 1, further comprising:
   control means for controlling said recording means to record said predetermined number of data blocks again in a corresponding recording track when said determination means determines that said predetermined number of data blocks are not recorded correctly on said corresponding recording track.

3. The recording/reproduction apparatus according to claim 1, wherein said count means counts said position data extracted by said position data extracting means.

4. The recording/reproduction apparatus according to claim 1, wherein said predetermined number of data blocks have data of the same bit length, said determination means comprising:
   interval detecting means for detecting whether intervals between the predetermined positions of said position data is constant in response to the output of said position data extracting means; and
   determination result output means, responsive to the output of said count means and an output of said interval detecting means, for determining whether said predetermined number of data blocks are correctly recorded in a corresponding recording track and for providing a determination result.

5. The recording/reproduction apparatus according to claim 4, wherein said determination means determines whether said predetermined number of data are correctly recorded for each of said plurality of recording tracks.

6. A recording/reproduction apparatus for recording data onto a recording medium having a plurality of recording tracks and for reading and reproducing the recorded data from said recording medium, comprising:
   recording means for serially recording a predetermined number of data blocks into each of said plurality of recording tracks, each of said predetermined number of data blocks having a track data indicating a recording track in which a corresponding data block is to be recorded;
   reproducing means for reproducing each data block recorded in said plurality of recording tracks by said recording means;
   count means for counting the number of said reproduced data blocks;
   track data extracting means for extracting said track data from each of said reproduced data blocks; and
   determination means, responsive to outputs of said count means and said track data extracting means, for determining whether the corresponding predetermined number of data blocks are correctly recorded onto each of said plurality of recording tracks.

7. The recording/reproduction apparatus according to claim 6, further comprising:
   control means for controlling said recording means to record said predetermined number of data blocks again onto a corresponding recording track when said determination means determines that the corresponding predetermined number of data blocks are not correctly recorded on said corresponding recording track.

8. The recording/reproduction apparatus according to claim 6, wherein said determination means comprises:

comparing means for comparing a track data extracted by said track data extracting means with a predetermined expected track data value; and determination result output means, responsive to the output of said count means and an output of said comparing means, for determining whether the corresponding predetermined number of data blocks are correctly recorded onto each of said plurality of recording tracks and for providing a determination result.

9. The recording/reproduction apparatus according to claim 8, wherein said determination means determines whether the corresponding predetermined number of data are correctly recorded for each of said plurality of recording tracks, said predetermined expected track data value is incremented every predetermined time period.

10. A recording/reproduction apparatus for recording data onto a recording medium having a plurality of recording tracks and for reading and reproducing the recorded data from said recording medium, comprising:

recording means for serially recording a predetermined number of data blocks into each of said plurality of recording tracks, each of said predetermined number of data blocks having a track data indicating a recording track in which a corresponding data block is to be recorded and a position data at a predetermined position;

reproducing means for reproducing each data block recorded in said plurality of recording tracks by said recording means;

count means for counting the number of said reproduced data blocks;

position data extracting means for extracting said position data from each of said reproduced data blocks;

track data extracting means for extracting said track data from each of said reproduced data blocks; and determination means, responsive to outputs of said count means, said track data extracting means and said position data extracting means, for determining whether said predetermined number of data blocks are correctly recorded in each of said plurality of recording tracks.

11. The recording/reproduction apparatus according to claim 10, wherein said count means counts said position data extracted by said position data extracting means.

12. The recording/reproduction apparatus according to claim 10, wherein said predetermined number of data blocks have data of the same bit length, and wherein said determination means comprises:

interval detecting means, responsive to the output of said position data extracting means, for determining whether intervals between the predetermined positions of said position data is constant;

comparing means for comparing a track data extracted by said track data extracting means with a predetermined expected track data value; and determination result output means for determining whether said predetermined number of data blocks are correctly recorded in a corresponding recording track in response to the output of said count means and outputs of said interval detecting means and said comparing means and for providing a determination result.

13. The recording/reproduction apparatus according to claim 12, wherein said determination means determines whether said predetermined number of data are correctly recorded for each of said plurality of recording tracks, said predetermined expected track data value is incremented every predetermined time period.

14. The recording/reproduction apparatus according to claim 13, further comprising:

control means for controlling said recording means to record said predetermined number of data blocks again onto a corresponding recording track when said determination means determines that said predetermined number of data blocks are not correctly recorded on said corresponding recording track.

15. A method of recording/reproducing data onto a recording medium comprising the steps of:

(a) serially recording a predetermined number of data blocks onto each of a plurality of recording tracks of the recording medium, each of the plurality of data blocks including position data recorded in a predetermined position;

(b) reproducing each of the recorded plurality of data blocks;

(c) counting the number of the reproduced plurality of data blocks to provide a count number;

(d) extracting the position data from each of the reproduced plurality of data blocks; and (e) determining whether the predetermined number of data blocks are correctly recorded in accordance with the count number and the extracted position data.

16. The method of recording/reproducing data of claim 15, wherein the plurality of data blocks have the same bit length and said step (e) of determining comprises detecting intervals between the predetermined positions of the extracted position data.

17. The method of recording/reproducing data of claim 16, further comprising the step of:

(f) recording the predetermined number of data blocks again in a corresponding one of the plurality of recording tracks when it is determined in said step (e) that the predetermined number of data blocks of the corresponding one of the plurality of recording tracks are incorrectly recorded.

18. A method of recording/reproducing data onto a recording medium comprising the steps of:

(a) serially recording a predetermined number of data blocks onto each of a plurality of recording tracks of the recording medium, each of the plurality of data blocks including track data indicating a recording track in which a corresponding data block is to be recorded;

(b) reproducing each of the recorded plurality of data blocks;

(c) counting the number of the reproduced plurality of data blocks to produce a count number;

(d) extracting the track data from each of the reproduced plurality of data blocks; and (e) determining whether the predetermined number of data blocks are correctly recorded in accordance with the count number and the extracted track data.

19. The method of recording/reproducing data of claim 18, wherein said step (e) of determining comprises comparing the extracted track data with an expected track value.

20. The method of recording/reproducing data of claim 19, further comprising the step of:

(f) recording the predetermined number of data blocks again in a corresponding one of the plurality of recording tracks when it is determined in said step (e) that the predetermined number of data blocks of the corresponding one of the plurality of recording tracks are incorrectly recorded.

21. A method of recording/reproducing data onto a recording medium comprising the steps of:

(a) serially recording a predetermined number of data blocks onto each of a plurality of recording tracks of the recording medium, each of the plurality of data blocks including position data recorded in a predetermined position and track data indicating a recording track in which a corresponding data block is to be recorded;

(b) reproducing each of the recorded plurality of data blocks;

(c) counting the number of the reproduced plurality of data blocks to provide a count number;

(d) extracting the position data from each of the reproduced plurality of data blocks;

(e) extracting the track data from each of the reproduced plurality of data blocks; and (f) determining whether the predetermined number of data blocks are correctly recorded in accordance with the count number, the extracted position data and the extracted track data.

* * * * *